United States Patent
Janzer et al.

(10) Patent No.: US 10,453,253 B2
(45) Date of Patent: Oct. 22, 2019

(54) VIRTUAL ASSET MAP AND INDEX GENERATION SYSTEMS AND METHODS

(71) Applicant: DG Holdings, Inc., Salt Lake City, UT (US)

(72) Inventors: Jesse Janzer, Sandy, UT (US); Jon Middleton, Salt Lake City, UT (US); Berkley Frei, Salt Lake City, UT (US)

(73) Assignee: DG Holdings, Inc., Salt Lake City, UT (US)

( * ) Notice: Subject to any disclaimer, the term of this patent is extended or adjusted under 35 U.S.C. 154(b) by 0 days.

(21) Appl. No.: 15/797,926

(22) Filed: Oct. 30, 2017

(65) Prior Publication Data

US 2018/0122139 A1  May 3, 2018

Related U.S. Application Data

(60) Provisional application No. 62/415,835, filed on Nov. 1, 2016.

(51) Int. Cl.
| | |
|---|---|
| *G06T 17/20* | (2006.01) |
| *G06T 17/00* | (2006.01) |
| *G06T 17/05* | (2011.01) |
| *G06T 15/00* | (2011.01) |
| *A63F 13/00* | (2014.01) |
| *G06Q 50/00* | (2012.01) |
| *H04W 4/02* | (2018.01) |
| *A63F 13/63* | (2014.01) |
| *G06F 3/0482* | (2013.01) |

(52) U.S. Cl.
CPC ............ *G06T 17/20* (2013.01); *A63F 13/00* (2013.01); *A63F 13/63* (2014.09); *G06Q 50/01* (2013.01); *G06T 15/005* (2013.01); *G06T 17/005* (2013.01); *G06T 17/05* (2013.01); *H04W 4/02* (2013.01); *G06F 3/0482* (2013.01); *G06T 2200/24* (2013.01)

(58) Field of Classification Search
CPC ..... G06T 17/20; G06T 2200/24; G06T 17/05; G06T 15/005; A63F 13/63; A63F 13/00; G06F 3/0482; G06Q 50/01; H04W 4/02
See application file for complete search history.

(56) References Cited

U.S. PATENT DOCUMENTS

| 8,522,330 B2 | 8/2013 | Shuster et al. | |
|---|---|---|---|
| 2009/0213113 A1* | 8/2009 | Sim ....................... | G06T 17/005 345/419 |

(Continued)

OTHER PUBLICATIONS

Criminisi, Antonio, Toby Sharp, and Andrew Blake. "Geos: Geodesic image segmentation." European Conference on Computer Vision. Springer, Berlin, Heidelberg, 2008.*

*Primary Examiner* — Yu Chen
(74) *Attorney, Agent, or Firm* — Stoel Rives LLP; R. Whitney Johnson

(57) ABSTRACT

A system for generating a nearest neighboring vertices index. The system includes a memory and one or more processors. The one or more processors receive a base figure asset and an item asset, determine nearest neighbor vertices between the base figure asset and the item asset using at least one of a k-dimensional tree algorithm and a geodesic algorithm, and generate the nearest neighboring vertices index based on the determined nearest neighbor vertices between the base figure asset and the item asset.

9 Claims, 6 Drawing Sheets

(56) References Cited

U.S. PATENT DOCUMENTS

| | | | |
|---|---|---|---|
| 2010/0079452 A1* | 4/2010 | Zhou | G06T 15/50 |
| | | | 345/420 |
| 2012/0117122 A1* | 5/2012 | Wang | G06F 17/3028 |
| | | | 707/797 |
| 2012/0190458 A1 | 7/2012 | Gerson et al. | |
| 2013/0275886 A1 | 10/2013 | Haswell et al. | |
| 2014/0043329 A1* | 2/2014 | Wang | G06T 17/20 |
| | | | 345/420 |
| 2014/0139525 A1* | 5/2014 | Grenfell | G06T 17/20 |
| | | | 345/423 |
| 2014/0214371 A1* | 7/2014 | Schulz | B29C 64/00 |
| | | | 703/1 |
| 2014/0229865 A1* | 8/2014 | Da Costa | G06F 3/04815 |
| | | | 715/757 |
| 2016/0350618 A1* | 12/2016 | Meekins | G06T 15/04 |
| 2016/0379083 A1* | 12/2016 | Sala | G06K 9/52 |
| | | | 345/633 |
| 2017/0140514 A1* | 5/2017 | Amirghodsi | G06T 5/50 |
| 2017/0161945 A1* | 6/2017 | Robert | G06T 17/005 |
| 2018/0053040 A1* | 2/2018 | Al-Osaimi | G06K 9/00214 |

* cited by examiner

VIRTUAL ASSET MAP AND INDEX GENERATION SYSTEMS AND METHODS

RELATED APPLICATION

This application claims the benefit under 35 U.S.C. § 119(e) of U.S. Provisional Application No. 62/415,835 filed Nov. 1, 2016, which is hereby incorporated by reference herein in its entirety.

TECHNICAL FIELD

The present disclosure relates to electronic or other virtual representations of an individual or entity in a computer generated environment. In particular, the present disclosure relates to systems and methods for portable and persistent virtual identity across applications and platforms.

DETAILED DESCRIPTION OF PREFERRED EMBODIMENTS

Figure 1:
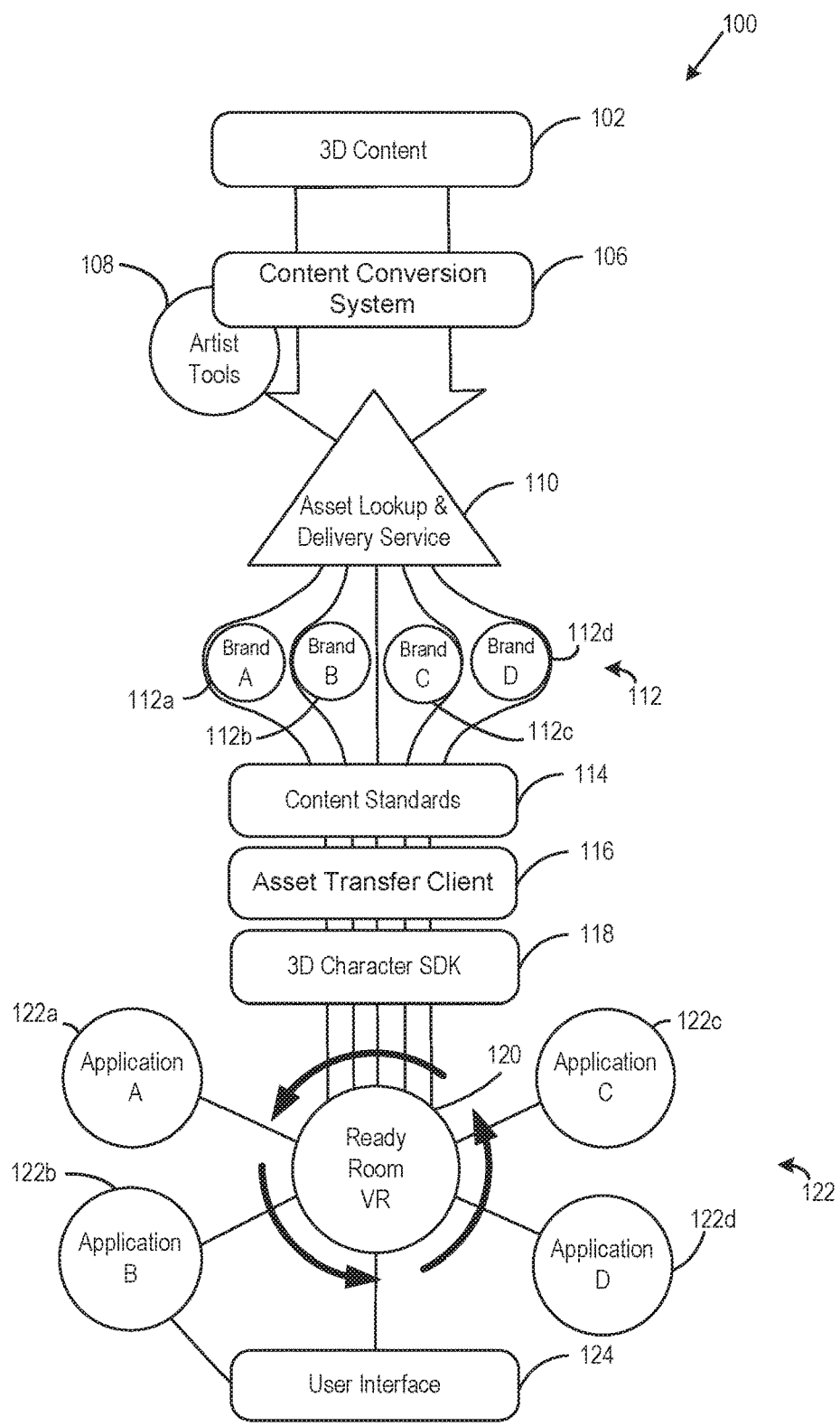
FIG. 1 is a system diagram for a persistent virtual identity system, according to one embodiment.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus, and methods are disclosed that enable a rendering process for generating indexes and maps that are used for various runtime algorithms to make numerous real-time rendering operations possible. Examples of the rendering processes include a neighbor vertices index, a polygon occlusion index, an alpha injection map, and a heterogeneous mesh index.

A neighbor vertices index represents a given vertex for a following 3D asset (sometimes referred to as an item asset) and the nearest weighted neighboring vertices in the base 3D asset as dictated by average distance to signify influence of the base asset (sometimes referred to as a base figure asset) on the given vertex. Neighboring vertices can be numbered between 1 and N where N is the number of vertices in the base 3D asset. In some embodiments, two different methods can be selected for determining the nearest neighbor, and/or a combination of those two methods can be selected as well. The methods include a k-d tree (k-dimensional tree) and traversing the geometry using geodesic algorithms on a combined mesh of the following 3D asset and base 3D asset. In artist tools a method can be provided for the creators of assets to override the generated neighbor vertices index by selection of a point and hand picking the vertices from the base 3D asset from which to derive influence. This allows the artist to hand tweak the results to get the exact results the creator of the following 3D asset wants. With the neighboring vertices data, the system creates indexes for quick lookup results. Examples of the indexes include keyed by base 3D asset vertex, base 3D asset polygon, following 3D asset vertex, influencing bones, or grouped by region such as head, body, arms, legs, hands, etc.

A polygon occlusion index and alpha injection map process creates both the occlusion index and the alpha injection map. The index represents what polygons in the base 3D asset the following 3D asset is fully occluding and partially occluding. The map is a per pixel representation of the area that the following 3D asset covers the base 3D asset as it is represented in UV space (which, in some embodiments, represents application of a 2D UV map in UV space to a 3D object in XYZ space). Use of this index and map is for algorithms that will fix multilayered depth issues and aid in combining meshes and textures into a single geometry, for example, the base 3D asset and following 3D asset loaded. With both assets loaded the system traverses both the polygons of the following 3D asset and, using ray tracing, shoot a ray from each vertex and the center points of the polygon from both sides of the polygon at a 90-degree angle from the plane of the polygon to determine occlusion. Another method and optimization includes taking the bounding box of the non-edge polygons in the following 3D asset and doing a direct overlay on the base 3D asset. The system flags everything within that bounding box where there is an overlap as fully occluded, significantly reducing the number of polygons from which to shoot rays. Using the generated polygon hit and overlay data generated with the ray trace technique, an image map is generated that mimics the UV map of the base 3D asset but represents the parts of the UV map where the polygons of the following 3D asset overlay. Using the UV map and overlay, the projected image of the following 3D assets is used to generate a new image that is the overlaid parts to give a pixel representation of what is occluded on the base 3D asset.

A heterogeneous mesh behavior index enables normal geometry representing form fitting material that will deform differently than metal or flowing dynamic cloth. When an underlying figure is made taller or more muscular, normal geometry deforms in the X, Y, and Z axes in the same amount as the base 3D asset. Other materials, such as metal, stay rigid and do not scale, or scale in an equal rate, such as a rate of 1:1:1, as the figure scaled along a given axis. This heterogeneous mesh index (or heterogeneous mesh behavior index) is a representation of polygons and vertices, or groups of polygons and vertices correlated to a kind of real world material behavior (such as what pivot points it would scale, rotate, or transform from, and behavior relationships along directions of the X, Y, and Z axes).

In some embodiments, UV space represents a two dimensional texture map with axes of U and V that map onto a surface of a 3D object.

Individuals are increasingly interacting with computing devices, systems, and environments and with other individuals in electronic or virtual forums, such as in computer games, social media and other Internet forums, virtual/augmented reality environments, and the like, sometimes referred to as cyberspace. These electronic interactions, whether individual-machine interactions or individual-individual interactions, increasingly are facilitated by a concept of virtual identity for each party to the interaction, which may be referred to as an application identity. The virtual identity enables a given party to identify itself to other entities in an interaction and/or enables other parties to recognize or identify the given party during the interaction.

A virtual identity can be embodied as simple as a profile, and can be more complex such as including an avatar or other graphical representation, a persona (e.g., an aspect of character of the virtual identity that is presented to or perceived by others), and/or a reputation (e.g., beliefs or opinions that are generally held about the virtual identity). In virtual reality (VR) applications, virtual identity can be very complex in order to provide a fuller, richer identity to other entities in VR encounters or other interactions. A virtual identity can be used to associate application data with a user. For example, a virtual identity can be used to correlate user data, application settings, pictures, and/or profiles with users, among other types of application data.

Presently, virtual identities are limited to a single application (e.g., specific to a given application and nontransferable to other applications). That is, a user may create a virtual identity for a given application and that virtual identity is not portable to, or persistent in, a different application. A user must create a separate virtual identity to use with each of a plurality of applications. As such, the user may have the burden of managing and/or maintaining a plurality of virtual identities. If the user experiences a change (e.g., a change of name, address, phone number, or the like), or desires to effectuate a change to a virtual identity (e.g. a change of an aesthetic feature such as an icon), then the user may have the burden of propagating the change through a plurality of virtual identities, each corresponding to a different application.

As virtual identities grow more complex and detailed (e.g., including greater amounts of associated information) the burden on a user may be further enhanced. For example, if the application identity is associated with a virtual application having a visual aspect, then the virtual identity may include a virtual avatar and other types of data associated with the virtual identity. A user may create, manage, and/or maintain a different virtual avatar for each of a plurality of virtual applications. If a user makes a change to an avatar associated with one virtual identity (e.g., a change of hair color), the user would need to then make the same change to the avatar associated with each other virtual identity in which the user may interact. In other words, if a user wants consistent (e.g., identical or similar) virtual identities across multiple applications, then when the user changes the hair color (or most any other visual aspect, such as shape, height, muscle definition, tattoos, sex, art style, default animation sets) of an avatar (e.g., a bipedal humanoid character) for a given virtual identity in one application the user will also have to make that same change for all other applications in which the user desires the corresponding avatars and/or virtual identities to be consistent.

A persistent virtual identity (e.g., including such aspects as an avatar, persona, reputation, etc.) that is portable across applications and/or platforms may be desirable. In some embodiments of the present disclosure, a single persistent virtual identity can be created, managed, and maintained for (and may be portable to) a plurality of applications, platforms, and/or virtual environments, whether social, business, gaming, entertainment, or any other platform that facilitates or otherwise wants users to have a visual presence in it.

An application can be a standalone computer program. An application can be a computer program to perform a group of coordinated functions, tasks, or activities for the benefit of a user. A video game may be an example of an application. An application that is a standalone computer program may optionally include or interact with online or remotely located components, such as data stores and cloud computing resources. A platform can be a group of different applications, services, and/or computing resources that provide a broader service. A platform can be or otherwise provide the environment in which an application is executed, and may include the hardware or the operating system (OS), or other underlying software (e.g., the stage on which applications and other computer programs can run). A platform may be heavily tied to or directed to an online functionality, such that the different applications, services, and/or computing resources may be distributed, or remotely located and interconnected via a network. A platform can provide a computing environment for a virtual environment (e.g., a virtual world). A persistent virtual identity can be developed and/or employed in multiple applications, platforms, and/or virtual environments.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods or components. Further, in some cases, well-known structures, or operations are not shown or described in detail in order to avoid obscuring aspects of the embodiments. Furthermore, the described features, structures, or characteristics may be combined in any suitable manner in one or more embodiments.

FIG. 1 is a system 100 diagram for a persistent virtual identity system according to one embodiment. The system 100 can include 3D content 102, a content conversion system 106, artist tools 108, an asset lookup and delivery service 110 (and/or library), content standards 114, an asset transfer client 116, a 3D character SDK 118, and a ready room in virtual reality (VR) 120. The system 100 can also include brand modules 112a, 112b, 112c, and 112d (sometimes referred to generally and collectively as "brand module(s) 112"). The system 100 can include a plurality of applications 122a, 122b, 122c, 122d (sometimes referred to generally and collectively as "application(s) 122") As can be appreciated, in some embodiments the applications 122 may be on a single common computing platform (e.g., in a common VR environment). In other embodiments, one or more on the applications may be on different, unique computing platforms. A user may interact with the system 100 by way of a user interface 124 that interfaces via the applications 122 and/or the ready room VR 120. The user interface 124 may be or operate on a user computing device. A user of the system 100 may include electronic users, such as a bot or an AI application, in addition to human users.

The system 100 can provide the ability to create and/or maintain a persistent virtual identity and/or a corresponding 3D asset(s), and to enable transport of such between applications (e.g., different games) and/or platforms (e.g., different augmented reality (AR) or VR systems). As used herein, the persistent virtual identity can include a base 3D asset (e.g., an avatar model and modifications thereto), following 3D assets (e.g., clothing, accessories, etc.), history associated with a user of the system, social reputations, social standing, inventory, wardrobe (e.g., additional clothing following 3D assets, which may include pre-saved outfits), and/or trophies, among other items associated with the persistent virtual identity. A virtual identity may include multiple 3D assets, which can include one or more base 3D assets (e.g., multiple avatars) and one or more following 3D assets. The 3D asset(s) can be at least partially defined using geometric data. The 3D asset(s) can further be presented as an avatar associated with the persistent virtual identity. For sake of simplicity, a "3D asset" referenced hereafter may be a base 3D asset, a following 3D asset, or a combination of one or more of these.

The applications 122 can be VR applications. The applications 122 can be independent of each other. The applications 122 can be gaming applications, social media applications, instructional applications, business applications, and/or any other type of application employing VR techniques. The brand modules 112 can provide conformity standards for the applications 122. That is, a 3D asset generated in the system 100 can conform to the standards defined by the brand modules 112 to be compatible with the respective applications 122. The applications 122 may all be on a single platform (e.g., HTC Vive®, Oculus Rift®, PlayStation VR®), or may be on different platforms.

In some examples, the applications 122 and/or the brand modules 112 can be external to the system 100. That is, the applications 122 and/or the brand modules 112 can be implemented independent of the system 100 (e.g., separate and distinct from the ready room VR 120, the asset lookup and delivery service 110, and the content standards, 114, although interfacing or otherwise communicating such as through an API). The applications 122 and the brand modules 112 are correlated. Stated differently, the brand modules 112 correspond to and provide standards, rules, protocols, and/or the like for the applications 122. For example, the application 122a is associated with the brand module 112a, the application 122b is associated with the brand module 112b, the application 122c is associated with the brand module 112c, and the application 122d is associated with the brand module 112d.

The system 100 can enable a persistent virtual identity that is portable and persistent to exist and be transported between the applications 122. A developer and/or a user can integrate or otherwise interconnect with the system 100 (e.g., via applications 122 and/or user interface 124, and generally over a network) to both create a persistent virtual identity, and potentially to interact with other persistent virtual identities created by and corresponding to other users. The user and/or the application developer can exercise control over the created persistent virtual identity. For example, the user can, through the user interface 124, interconnect with the ready room VR 120 to manipulate the virtual identity. The user can also manipulate the virtual identity through applications 122. FIG. 1 shows the user interface 124 interconnected with the system 100 through the ready room VR 120 and the application 122b.

The system 100 can include a three dimensional (3D) character software developer kit (SDK) 118 (e.g., an MCS Plugin). The 3D character SDK 118 may be a library that can be implemented in an application 122. The 3D character SDK 118 includes functionality to perform operations like create 3D assets (e.g., avatars, in a scene), shape them, add/remove clothing and other following 3D meshes, etc. The 3D character SDK 118 also includes functionality to obtain 3D models (for base 3D assets) and accompanying information from the local cache (and if a 3D model and/or accompanying information isn't in the local cache, the 3D character SDK 118 can transparently fetch the 3D model and/or accompanying information from the cloud). The 3D character SDK 118 can also transform 3D models into game ready objects, namely 3D assets. The 3D character SDK 118 can also provide other asynchronous operations, which provides an event or task queue.

The system 100 can also include an asset transfer client 116 (e.g., ready room plugin) and an asset lookup and delivery service 110 (and/or library). The asset transfer client 116 and the asset lookup and delivery service 110 can be local and/or remote to the system 100. That is, the asset transfer client 116 and/or the asset lookup and delivery service 110 can be executed (e.g., hosted) on a network computing device remote to the system 100 that can be accessed by the applications 122. As used herein, the asset lookup and delivery service 110 allows the asset transfer client 116 to request a specific 3D asset with permutations on the request for specific level of detail, material, and texture variation. The asset lookup and delivery service 110 can also provide (e.g., stream) the 3D asset to the asset transfer client 116. As used herein, a material may be a combination of texture files, shaders, and different maps that shaders use (normal map, occlusion map) and other data such as specularity and metallic levels depending on the material type. A material may be a visual layer that makes something within a 3D asset look like more than just polygons.

The asset transfer client 116 can include two or more components remotely located from each other and communicating together, such as over a network. A first component of the asset transfer client 116 can be implemented in the user interface 124 and/or the applications 122. A second component of the asset transfer client 116 can be implemented in the system 100. The first component of the asset transfer client 116 can communicate with the second component of the asset transfer client 116, for example to request a 3D asset. The component of the asset transfer client 116 implemented in the system 100 can request or otherwise obtain the 3D asset from the asset client lookup and delivery service 110.

The system 100 can also include the content standards 114 which includes standards for the brand modules 112 and/or the applications 122. The content standards 114 can specify types of content or groups of content based upon the creator of the asset, the genre of the asset, or the art style of the asset. The content standards 114 can specify types of content or groups of content through the use of filters. The filters can operate on metadata associated with the 3D assets comprising the content or groups of content. The metadata can identify a vendor from which the 3D asset originated, a genre of the 3D asset, and an artistic style of the 3D asset, among other types of data included in the metadata.

A genre can include, for example a fantasy genre, a science fiction (sci-fi) genre, a comic book genre, and/or contemporary genre, among other genres. An artistic style can be defined by vendors who create new artistic styles. The system 100 can have a default artistic style such as a Nikae artistic style and a Minecraft-esque artistic style.

The content standards 114 can also specify what types of 3D assets are allowed in respective applications 122 and/or what types of 3D assets are not allowed in respective applications 122. For example, the content standards 114 can define that 3D assets with a default artistic style and a fantasy genre are allowed in a given corresponding application 122c and that 3D assets of a different artistic style and a different genre are not allowed in the application 122c.

The content standards 114 can also specify that 3D assets originating from a particular vendor are allowed in a corresponding application from the applications 122. For example, the content standards 114 can restrict the transfer of 3D assets to the application 122d to 3D assets that were originated by a vendor of the application 122d.

The content standards 114 can define 3D assets that are restricted from specific brand modules 112 and/or applications 122 to maintain consistent or inconsistent visual effect. The content standards 114 can be implemented in the asset lookup and delivery service 110 to regulate content provided to the applications 122. The content standards 114 can also be implemented in applications 122 and/or the user interface 124 as part of the asset transfer client 116 to regulate content downloaded and cached at the applications 122 and/or the user interface 124.

The artist tools 108, the content conversion system 106, and the ready room VR 120 may be supporting systems to the system 100. Stated otherwise, they may be supplemental and/or ancillary to the system 100, such that they could be implemented separately and distinctly (e.g., on a different computing device, network, or the like) from other elements of the system 100. The artist tools 108 can modify 3D assets to make the 3D assets compatible with the 3D character SDK 118. The content conversion system 106 can convert the 3D content 102 to be performant (e.g., to perform well, such as within performance metrics) for run time applications. The content conversion system 106 can also convert the 3D content 102 to be compatible with the 3D character SDK 118. The 3D content 102 can include, for example, high fidelity photo-real assets and/or low fidelity game-ready assets. The 3D content 102 can be created, for example, by a 3D content creator such as a Daz® 3D application.

The ready room VR 120 can be an application. The ready room VR 120 can be a hub and/or a starting point for persistent virtual identity creation. The ready room VR 120 can also be a default process for moving persistent virtual identities between applications.

The 3D character SDK 118 can enable a base figure (e.g., a base 3D asset representing an avatar that is part of a persistent virtual identity, or other base 3D asset) to be changed into any shape and/or size and retain full functionality for fitting clothing, animating, and/or customizing. Using the 3D character SDK 118, the base 3D asset can be extendable to a potentially unlimited number of variations for creation of a unique avatar. Stated otherwise, characteristics of a 3D asset can be modified in a potentially unlimited number of combinations of variations. Then the system 100 can enable the resultant unique avatar to retain a visual identity across artistic stylings (e.g., if the application 122a implements a first styling, for example a cartoon styling, and the application 122b implements a second styling, for example a realistic styling, then the unique avatar can retain a visual identity as the avatar is shown in a cartoon styling in the application 122a and a realistic styling in the application 122b). The 3D character SDK 118 can include a number of modules and/or services for performing specific operations to modify or otherwise configure characteristics of 3D assets. For example, the 3D character SDK 118 can include a morphing module, a joint center transform (JCT) bone module, a standard shape module, a projection module, a head scanning to a dynamic mesh fitting module, a heterogeneous mesh behavior module, a hair module, and a smart props module.

The artist tools 108 is one or more standalone modules, potentially including computer-readable instructions configured to convert 3D assets to a form/format compatible with the system 100. The artist tools 108 can receive a 3D asset (e.g., geometry), which may be configured in a number of different formats. The artist tools 108 can be configured to group the geometry into items; set up the level of details (LODs) for an item; generate geographical maps (geomaps); add self-defining behavioral information to objects for run-time simulation; set up materials and generate materials for different platforms; configure the geometries' multilayered characteristics for runtime-optimized multilayer depth and volumetric preservation between meshes; and/or set up zones on items for heterogeneous mesh deformation (e.g., so that something like metal deforms differently than cloth to an avatar's shape). As used herein a geomap comprises geometry, a vertex index, and a map outlining an optimized correlation between a following mesh and base mesh to be used for real time calculation and generation of multilayer depth solutions and/or projection solutions. Projection references the act of projecting a deformer from one mesh to another.

The artist tools 108 also set up the custom shaping of a base 3D asset and set up the 3D assets into specific art styles to allow automatic avatar preservation between art styles. The output of the artist tools 108 can be either a single 3D asset and/or a collection of 3D assets which can be compatible with the 3D character SDK 118. The 3D assets modified by the artist tools 108 can be uploaded to the asset lookup and delivery service 110. The 3D assets can further be configured at the asset lookup and delivery service 110 for user specified distribution based upon rules and conditions associated with the 3D asset and as provided by the brand modules 112.

The ready room VR 120 can be a base application that facilitates interaction between a user and the system 100. A base application can be different from the applications 122, such that the base application is a standalone application that can be executed independently from the applications 122. The user can create and customize a 3D asset via the ready room VR 120 using additional content (e.g., following 3D assets) converted with the artist tools 108, made available through the asset lookup and delivery service 110, delivered through the asset transfer client library 116, and passed to the 3D character SDK 118. For example, the user can, via the user interface 124, access the ready room VR 120 to create and/or customize a 3D asset and launch at least one of the applications 122 through the ready room VR 120.

In some examples, the user can create and customize an avatar (or otherwise configure a base 3D asset) via the application 122b. For example the user can access the application 122b and through the application 122b access the ready room VR 120, or functionality of the ready room VR 120 (e.g., to create and customize a 3D asset). Stated differently, functionality of the ready room VR 120 may be implemented or otherwise integrated with the application 122b, such that a user of the application 122b can create and/or customize an avatar or other 3D assets within the a context of the application 122b.

The ready room VR 120 can showcase the core functionality of the system 100 from an end user's perspective. The ready room VR 120 can provide both a place to customize a 3D asset, including an avatar, a shape and/or clothing associated with the 3D asset, and a place to demonstrate the process and/or standards of "walking between applications." The ready room VR 120 provides multiple means to transfer an identity between applications 122, interconnect between multiple open VR applications 122, and incorporate face scan data onto the avatar. The ready room VR 120 can provide different example implementations of a user interface (UI) for shopping, previewing, and/or checking out of stores, among different types of checkout processes.

Once compatible content is acquired, a user can use and customize the 3D asset. A persistent virtual identity for the user can be created, and then the user can activate a mechanism to allow an acquired and/or created 3D asset (e.g., avatar) to transport (e.g., transfer) or step into any one of the applications 122. That is, a 3D asset associated with a user can retain an identity as the 3D asset transitions from the ready room VR 120 into one of the applications 122, and then provide end points for the user to return to the ready room VR 120. The virtual identity of a user, including a corresponding avatar or other 3D asset, can be maintained consistent across multiple applications 122, and as the virtual identity is transported from one application 122, to the ready room VR 120, and/or to another application 122. The 3D asset can also extract and retain items (e.g., a virtual weapon, or other object 3D asset) from the applications 122 that can persist in the ready room VR 120 as the 3D asset transitions from one of the applications 122 into the ready room VR 120 and then to another of the applications 122.

The persistent virtual identity can be associated with, and representative of a user that is external to the system 100. A user can be a human user and/or an automated user.

In some examples, transitioning a 3D asset from a first application (e.g., application 122a) to a second application (e.g., application 122b) can include conforming to standards set by the second application. The standards can include a specific art style and/or theme. Transitioning a 3D asset from a first application to a second application can include placing the 3D asset in a VR room (e.g., lobby) of the first application 122a where the user and/or the 3D character SDK can initiate the required changes to the 3D asset before fully transitioning the 3D asset to the second application.

The transfer of 3D assets between applications includes configuring a 3D asset so that the 3D asset's customizations are retained as the 3D asset transitions from one application to a different application, such that the settings and status of the 3D asset remain the same. The transfer of 3D assets is one example of a persistent virtual identity. The transfer of 3D assets can be accomplished by utilizing a local backdoor module and/or a remote restore module. These modules enable the transfer of an identity between applications 122.

The local backdoor module can include an application 122a calling the asset transfer client 116 to export a 3D asset (e.g., a 3D asset file) and/or a persistent virtual identity (e.g., an identity file) comprising geometry, skinning, rig, textures, materials, and shaders of the current 3D asset with associated items in use, and/or any additional metadata describing the 3D asset and/or persistent virtual identity. After the export is finished, the application 122a launches the application 122b with reference to the local identity file, and then shuts itself down. The application 122b can access the identity and request the local identity definition from the asset transfer client 116 and load the identity into the application 122b.

The remote restore module can be configured to cause the application 122a to call the asset transfer client 116 to push the identity definition metadata to the asset lookup and delivery service 110. The application 122a can then launch the application 122b with an identity string, and then shut itself down. The application 122b can request that the asset transfer client 116 call the asset lookup and delivery service 110 requesting the identity string. The application 122b can likewise retrieve metadata associated with the persistent virtual identity. The application 122b can use either local 3D assets (e.g., locally stored) or remote 3D assets (e.g., streamed or otherwise provided or accessed from a remote location) to render the avatar.

In some examples, the asset transfer client 116 can comprise one or more components. For example, the asset transfer client 116 can comprise a client and a server. The client can be implemented in the applications 122 and/or computing devices on which the applications 122 are executing. The server of the asset transfer client 116 can be implemented in the system 100. The client can communicate with the server to transfer a 3D asset from the system 100 to the computing device of the applications 122.

To transfer a 3D asset and/or persistent virtual identity between applications, the user can select a destination application 122b from a source application 122a. Once selected, a gate or portal may be generated within the source application 122a. The source application may portray the gate and/or portal as a visual appearance branded for the destination application 122b. The gate and/or portal may transition the 3D asset and/or persistent virtual identity from the source application 122a to virtual space (e.g., referred to as the "airlock") that is configurable and customized by the destination application 122b (e.g., a destination application vendor and/or the corresponding brand module 112b). The mechanism to trigger the transfer of a 3D asset may include walking and/or other locomotion methods within a VR environment provided by the source application 122a toward the gate or portal of the destination application 122b.

The transferring of the 3D asset and/or the persistent virtual identity from source application to the virtual space through the virtual portal may trigger a VR passport check. The VR passport check compares clothing and/or an art style associated with the 3D asset and/or the persistent virtual identity with vendor specific standards of the destination application 122b. If the 3D asset and/or persistent virtual identity does not conform to the destination application 122b, then the user is provided an opportunity to change clothing, art style, or any other aspect associated with the 3D asset and/or persistent virtual identity, to meet the destination application standards. Once the standards are met, a launch mechanism, through another virtual portal, the pushing of a button, or the act of meeting the standards, will initiate a transfer of the 3D asset and/or the persistent virtual identity between the source application 122a and the destination application 122b.

A set of standards between applications 122 and vendors can be defined. The standards can foster an increased level of persistence and transfer to exist between different applications 122. The standards enable enhanced functionality to allow standard behavior and transfer of assets or mechanics between disparate applications 122. For example, an application agnostic content interchange can be defined to facilitate the association between 3D assets and/or persistent virtual identities and a given application 122a (e.g., a source application 122a) and the transfer of the persistent virtual identity to other applications 122 (e.g., a destination application 122b). Transferring the persistent virtual identity and/or 3D asset can include losing permanence in the source application 122a and creating permanence in the destination application 122b with a conforming set of behaviors, mechanics, and appearances.

In some examples, face scan data can be associated with a dynamic mesh. Associating scan data with a dynamic mesh can include taking face scan data and changing a base figure, associated with the 3D asset and/or persistent virtual identity, to incorporate the face scan data such that the base figure retains the same mesh topology while retaining functionality for further shaping of the mesh (e.g., making the face narrower, nose larger, ears pointed, etc.).

The face scan data can be placed on a dynamic mesh. The face scan data can be 3D scanner generated and/or photogrammetry generated (e.g., mesh and texture). The face scan data can also be generated using various images and/or other means. Placing the face scan data on a dynamic mesh can deform the base figure associated with a 3D asset and/or persistent virtual identity to match the visual appearance of the face scan data. Placing the face scan data on a dynamic mesh can generate texture to match the face scan data on the base figure associated with the 3D assets and/or persistent virtual identity.

The face scan data can be compared with the base figure to identify where key facial and head landmarks are on both sets of data (e.g., face scan data and base figure and/or base 3D asset). The base mesh associated with the base figure is deformed to the same shape as the face scan data using automated adjustments of existing blend shapes for each key region of the face. In some examples, a new blend shape can be generated for the base figure to match the face scan data. The face scan generated texture can be analyzed and, using key face and head landmarks, the texture can be rebuilt to fit the base figure's UV map. The face scan generated texture can comprise multiple texture files. The multiple texture files can be combined into a single texture file for the head of a base figure. Fitting face scan data to a base figure can be performed using a custom rig and geomap technology to compare and match the base figure mesh to the face scan data. As used herein, blend shaping, morphing, and deforming references a set of data attached to a mesh which contains positional deltas on geometry and bones to allow the mesh to change shape while not changing its fundamental geometry and/or rig.

When configuring an avatar, if there is face scan data associated with the 3D asset and/or the application identity associated with the 3D asset, the ready room VR 120 can associate the face scan data with the 3D asset such that the 3D asset retains the full customization and compatibility of the base figure without any scanned data. As such, a 3D asset can be configured with the face scan data. The face scan data can be provided, by the user, by uploading a mesh to a server associated with system 100 through at least one of a web form or mobile application.

As used herein, the system 100 can be implemented in a single computing device and/or over a plurality of computing devices. For example, each of the components of the system 100 can be implemented using independent computing devices coupled via a network. In some examples, the system 100 can be implemented using cloud services.

Figure 2:
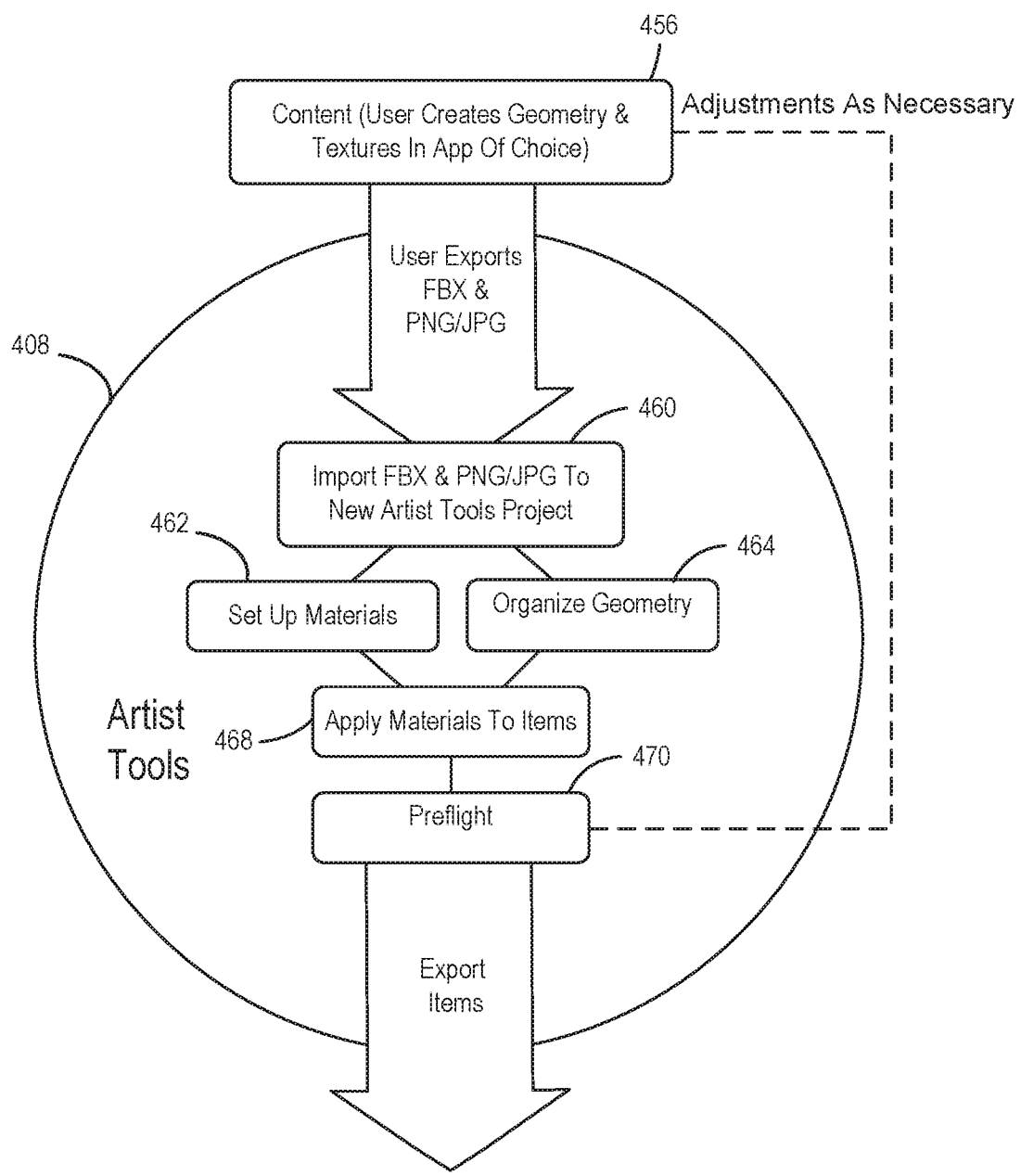
FIG. 2 is a block diagram of artist tools, according to one embodiment.

FIG. 2 is a block diagram of artist tools 408, according to one embodiment. The artist tools 408 includes an import module 460, a materials module 462, a geometry module 464, an application module 468, and a preflight module 470.

A user (e.g., 3D artist) can export content 456 created using a 3D content creation application (e.g., Maya, Blender, and/or 3DS Max) to a filmbox format (e.g., FBX), a portable network graphic (PNG) format, and/or a joint photographic expert group (JPEG) format (e.g., JPG format), among other possible formats. The 3D artist can also export textures and materials, in standard formats, associated with the content created using the 3D content creation application.

The artist tools 408 is a standalone application that imports the content 456 (e.g., in the standard format exported from the 3D content creation application) and configures the content 456 to be compatible with the 3D character SDK. The content 456 can be imported via the import module 460. The content 456 can include user created geometry and textures.

The user can then create a new project and import the content 456 (e.g., FBX file) into the project. The content 456 can include geometry, materials, rig, and/or textures. The content 456 can be parsed. The organize geometry module 464 enables a user to organize the geometry into items. The user can also create metadata and associate the metadata with the items to allow the items to be identified. The metadata can provide an automatic behavior associated with the items. The metadata can also provide a level of detail groups for the items.

The artist tools 408 can also configure new materials or select existing materials via the materials module 462. The artist tools 408 can also apply the material to the items via the application module 468 by associating the materials with the corresponding items. Once set up, the items are prepped and tested to ensure that the items function properly. The items can be tested via the preflight module 470. The test can include geomap generation, alpha injection mapping using multilayer depth preservation techniques, auto skinning of the asset if needed, setting up heterogeneous mesh behavior, and/or more.

Once the tests are complete, a user (e.g., 3D artist), via the artist tools 408, can drive the content through fitting to a base figure, and test out the deformation and animation to ensure that the content functions properly. The user can make adjustments as necessary to ensure that the content functions properly. The artist tools 408 can then export the items in standard formats to other applications. The artist tools 408 can also export the items in formats accepted/recognized by the 3D character SDK.

As mentioned above, the Artist Tools 108, 408 are one or more standalone modules configured to generate, for example, geographical maps, alpha injection maps, and heterogeneous mesh indexes. The artist tools 108, 408 (e.g., the preflight module 470) may use these maps and indexes to test items.

Figure 3:
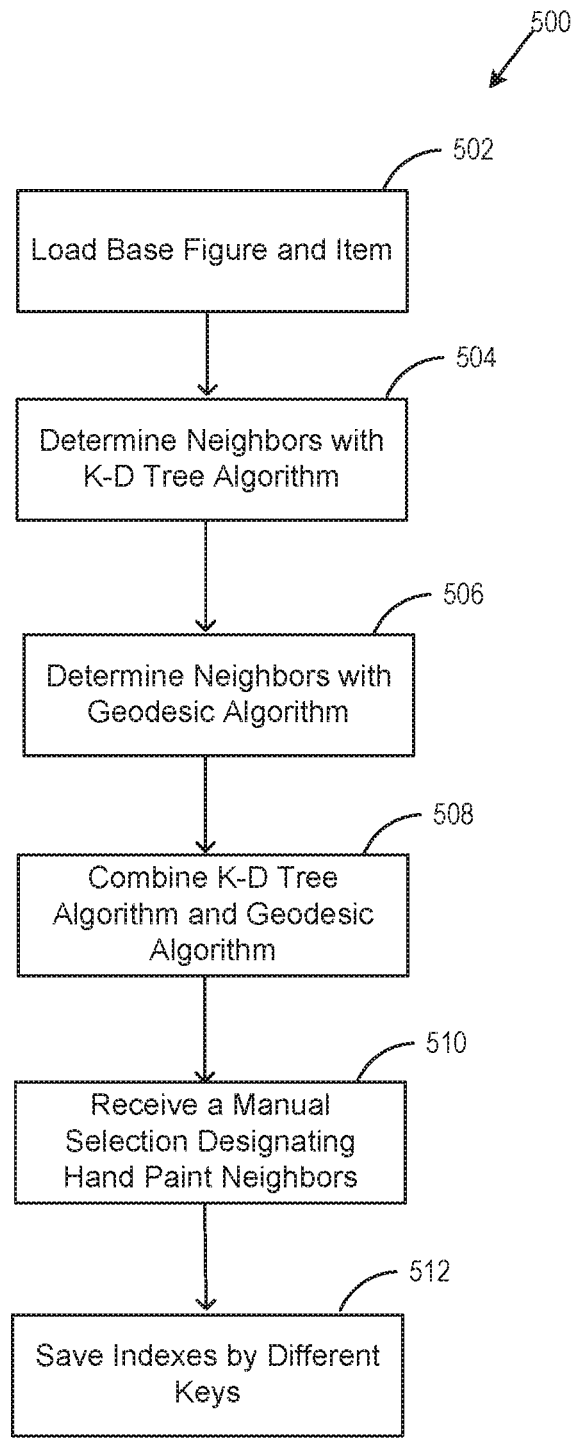
FIG. 3 is a flow chart for generating a nearest neighbor vertices index.

FIG. 3 illustrates a flow chart 500 for determining the neighbor vertices index, to determine how an item (e.g., item asset or item 3D asset) correlates to a base figure (e.g., a base figure asset, base 3D asset). Neighboring vertices can be numbered between 1 and N, where N is the number of vertices in the base figure. For practical purposes, an upper limit of 10 vertices is generally imposed on the base figure, with a default of 4 vertices. However, N can be any number desired to create a more accurate neighboring vertices index and can be changed as needed.

The artist tools 108, 408 loads 502 the base figure and the item. The item is placed on top of the base figure as it would normally function or be fitted onto a 3D asset. Preferably, the neighboring vertices are determined 504 using a k-dimensional (k-d) tree algorithm and also determined 506 by traversing the geometry using a geodesic algorithm on a combined mesh of the base figure and the item. The results of the k-d tree algorithm and the geodesic algorithm are combined 508 to determine a more accurate result of neighboring vertices. However, in other embodiments, only a single algorithm, either a k-d tree algorithm or a geodesic algorithm, is run to determine the neighboring vertices, and a combination of the algorithms is omitted.

An example of using a combination of a k-d tree algorithm and a geodesic algorithm would be using the geodesic algorithm in all directions to determine the nearest neighboring vertices in the base figure and then using the k-d tree algorithm to determine the straight path nearest neighbors. With both data sets of nearest neighbors, the one or more modules of the artist tools 108 or 408 compares the geodesic distances between the geodesic neighbors and the k-d tree neighbors to determine the best nearest neighbors vertices of a base figure. This generates the initial neighboring vertices index.

Once the initial neighboring vertices index is determined, the artist tools 108 or 408 receives 510 a manual selection from a creator or user. The manual selection designates a selection of a point on the item by a creator or user and hand painting the vertices from the base figure to derive influence on that point on the item. This allows a user to modify the neighboring vertices index (in effect overriding the generated neighboring vertices index) to get the desired effect of the creator or artist.

The neighboring vertices index data is saved 512 into the index based on a key value designating portions of the base figure or item. For example, the neighboring vertices index can be saved into the index based on base figure vertex, base figure polygon, item vertex, or influencing bones, or grouped by regions such as head, body, arms, legs, hands, etc.

A k-d tree (or k-dimensional tree) is a binary tree in which every node is a k-dimensional point. Each internal node implicitly generates a splitting hyperplane that divides the space into two parts, known as half-spaces. Points to the left of this hyperplane are represented by the left subtree of the selected internal node and points right of the hyperplane are represented by the right subtree of the selected internal node. The hyperplane direction is chosen by: each node in the tree is associated with one of the k-dimensions, the hyperplane being perpendicular to the associated dimension's axis. For example, if the "x" axis is chosen, points in the subtree with a smaller "x" value than the node appear in the left subtree and points with larger "x" value appear in the right subtree. The hyperplane is set to the x-value of the point, and the normal is the unit x-axis.

Geodesic algorithms can determine a shortest path between a source on a mesh and one or more destinations of the mesh. For example, an algorithm by Mitchell, Mount, and Papadimitriou (MMP) partitions each mesh edge into a set of intervals (windows) over which the exact distance computation can be performed atomically. These windows are propagated in a "continuous Dijkstra"-like manner.

Figure 4:
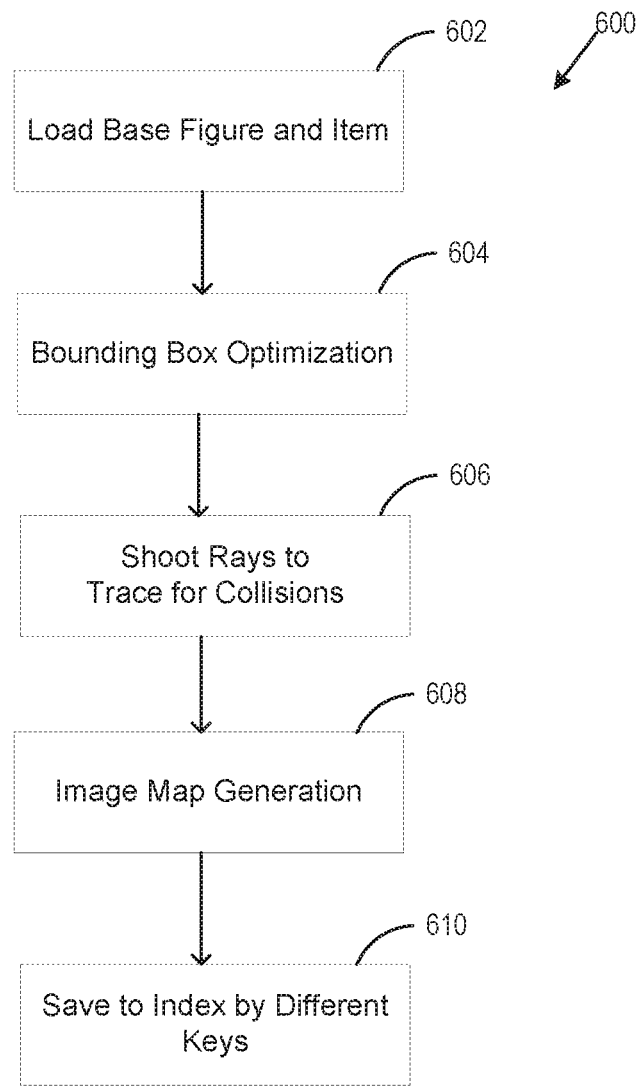
FIG. 4 is a flow chart for generating an occlusion index and an alpha injection map.

FIG. 4 illustrates a flow chart 600 for generating the occlusion index and the alpha injection map. The occlusion index represents which polygons in the base figure the item is fully occluding and partially occluding. The alpha injection map is a per pixel representation of the area that the item covers of the base figure as represented in a UV space. The occlusion index and the alpha injection map are used by algorithms that fix multilayered depth issues in a 3D asset and aid in combining meshes and textures into a single geometry.

Initially, the artist tools 108 or 408 loads 602 the base figure and the item. In some embodiments, a bounding box optimization 604 may be performed. The bounding box optimization 604 includes directly overlaying a bounding box of the non-edge polygons of the item on the base figure. Everything in the base figure that is within the bounding box is marked as fully occluded. This results in the number of polygons that rays must be shot from, as discussed in more detail below, being reduced because rays do not need to be shot from the fully occluded points since they have already been marked as fully occluded.

The polygons of the item are traversed, and using ray tracing, rays are shot 606 from each vertex and center points of the polygon of the item from both sides of the polygon at a 90-degree angle from the plane of the polygon. If one of the two rays shot 606 from each point of the polygon of the item collides with a polygon in the base figure, the relationship between the item polygon occluding the base figure is recorded. Then, the same ray trace method is performed on the collided polygons of the base figure, and hits and misses are recorded. If there are no misses of the ray, that polygon is considered fully occluded. If there is a miss where either ray from a given point in the base figure collides with the item within a short distance constraint, the polygon is marked as partially occluded. This is then saved into a polygon occlusion index for quick lookup. Each occlusion can be keyed in the index, as discussed above with respect to FIG. 3.

Using the overlay data from the bounding box optimization 604 and the polygon hit from the ray tracing algorithm, an alpha injection image map is generated 608 that mimics the UV map of the base figure but represents the part of the base figure UV map where the polygons of the item overlay. The UV map and the overlay of the project image are used to generate a new image that consists of only the overlaid parts of the base figure to generate a pixel representation of the polygons occluded on the base figure. This is then keyed 610 to the index for quick lookup.

The image generation map is keyed to the index in the same manner as discussed above with respect to FIG. 3.

Figure 5:
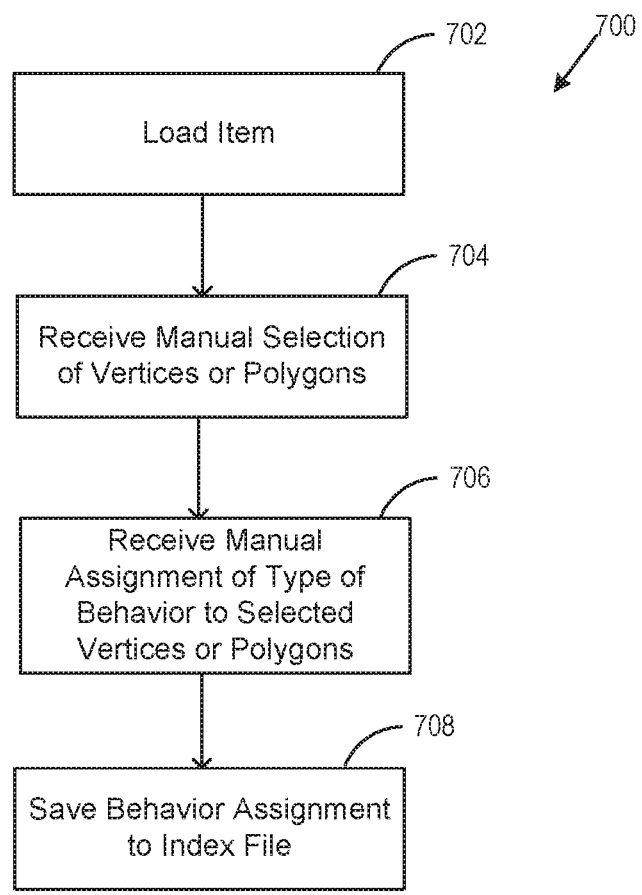
FIG. 5 is a flow chart for generating a heterogeneous mesh behavior index.

FIG. 5 illustrates a flow chart 700 for generating a heterogeneous mesh behavior index. Normal geometry for form fitting materials will deform differently on a 3D asset than metal or flowing dynamic cloth. When an underlying figure, or 3D asset, is made taller or more muscular, normal geometry will deform in the X, Y, and Z axes the same amount as the base figure. Other materials, such as metal, stay rigid and do not scale, or just scale in an equal amount of 1:1:1 as the 3D asset scaled along a given axis.

The heterogeneous mesh index is a representation of polygons and vertices, or groups of polygons and vertices, and what kind of real world material the polygons and vertices should behave like; what pivot points scale, rotate, or transform from; and in which directions along the X, Y, and Z axes the polygons or vertices behave.

To generate the heterogeneous mesh index, the artist tools 108 loads 702 the item. The artist tools 108 or 408 receives 704 a manual selection of vertices or polygons of the item, which can include a singular vertex or polygon, or a group of vertices and polygons that scale together. The artist tools 108 or 408 also assigns 706 the type of behavior to the selected vertices or polygons of the item for scaling based on another manual selection by a creator or user. The assignment 706 of the behavior is saved 708 within the heterogeneous mesh index. This is done for each desired vertices or polygons, or group of vertices and polygons, to create the entire heterogeneous mesh index.

For example, a belt item consists of a belt strap and square belt buckle. The polygons and/or vertices of the belt strap may be selected and configured by the creator as normal geometry. Then, if an underlying base figure is scaled, the belt strap scales normally with the underlying 3D asset. The polygons and/or vertices of the belt buckle may be selected and configured as metal. When the underling base figure is scaled, the belt buckle scales along its X, Y, and Z axes in a 1:1:1 ratio so that the belt buckle does not become rectangular or trapezoidal.

Figure 6:
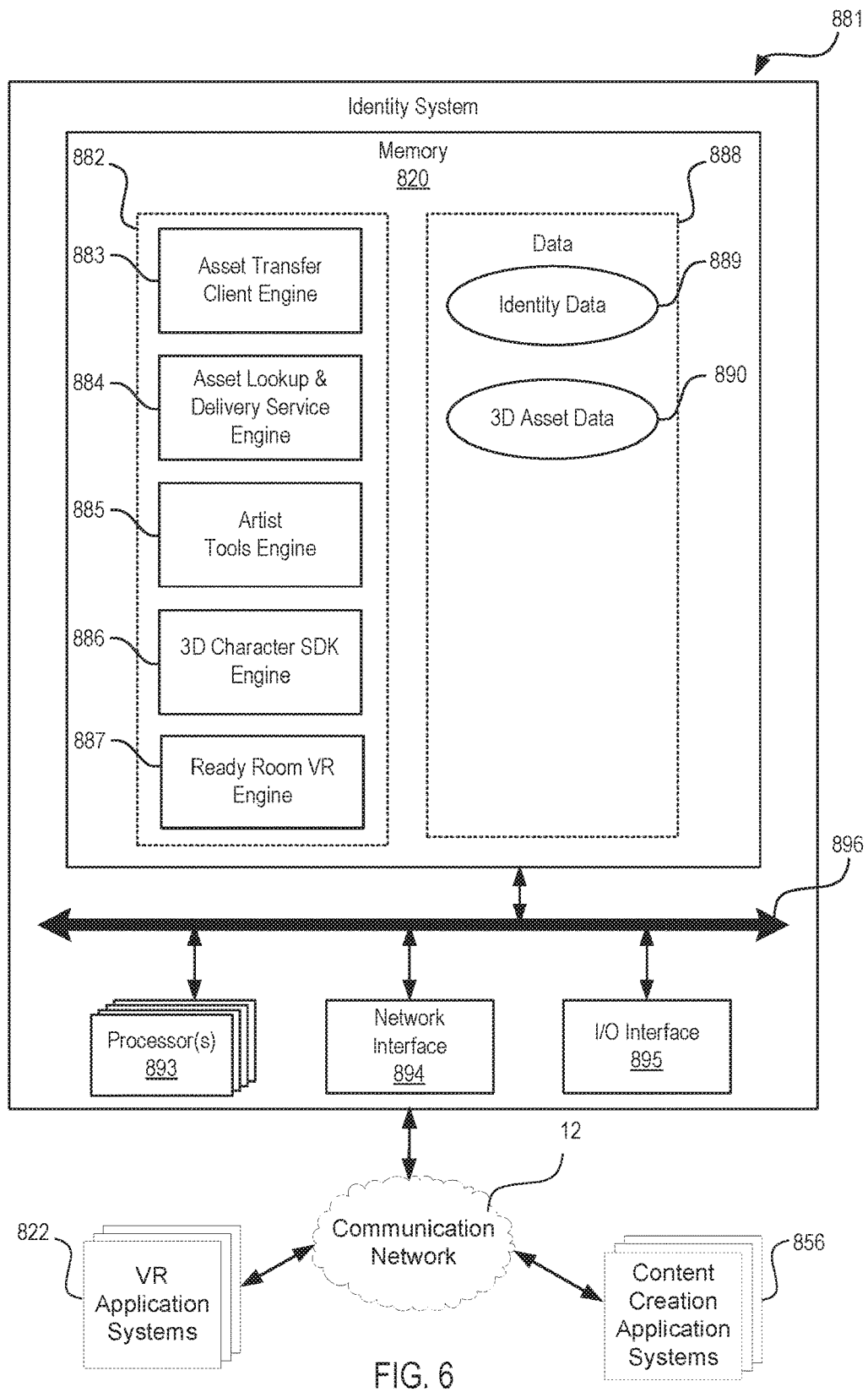
FIG. 6 is a block diagram of an identity system, according to one embodiment.

FIG. 6 is a block diagram of an identity system, according to one embodiment The mobile device identity system 881 can generate a persistent virtual identity that can be transferred between applications, potentially on different application systems 822. The identity system 881 can include a memory 820, one or more processors 893, a network interface 894, an input/output interface 895, and a system bus 896. The identity system 881 may be the same as or analogous to the interface system 100 in FIG. 1. The identity system 881 may interface with one or more VR application systems 822 via a communication network 12. The identity system 881 may provide persistent virtual identity for the VR application systems 822. The identity system 881 may also interface with one or more content creation application system 856 to obtain 3D assets.

The one or more processors 893 may include one or more general purpose devices, such as an Intel®, AMD®, or other standard microprocessor. The one or more processors 893 may include a special purpose processing device, such as ASIC, SoC, SiP, FPGA, PAL, PLA, FPLA, PLD, or other customized or programmable device. The one or more processors 893 can perform distributed (e.g., parallel) processing to execute or otherwise implement functionalities of the presently disclosed embodiments. The one or more processors 893 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 820 may include static RAM, dynamic RAM, flash memory, one or more flip-flops, ROM, CD-ROM, DVD, disk, tape, or magnetic, optical, or other computer storage medium. The memory 820 may include a plurality of program engines and/or modules 882 and program data 888. The memory 820 may be local to identity system 881, as shown, or may be distributed and/or remote relative to the identity system 881.

The program engines 882 may include all or portions of other elements of the identity system 881. The program engines 882 may run multiple operations concurrently or in parallel with or on the one or more processors 893. In some embodiments, portions of the disclosed modules, components, and/or facilities are embodied as executable instructions embodied in hardware or in firmware, or stored on a non-transitory, machine-readable storage medium, such as the memory 820. The instructions may comprise computer program code that, when executed by a processor and/or computing device, cause a computing system (such as the processors 893 and/or the identity system 881) to implement certain processing steps, procedures, and/or operations, as disclosed herein. The engines, modules, components, and/or facilities disclosed herein may be implemented and/or embodied as a driver, a library, an interface, an API, FPGA configuration data, firmware (e.g., stored on an EEPROM), and/or the like. In some embodiments, portions of the engines, modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The memory 820 may also include program data 888. Data generated by the identity system 881, such as by the program engines 882 or other modules, may be stored on the memory 820, for example, as stored program data 888. The stored program data 888 may be organized as one or more databases. In certain embodiments, the program data 888 may be stored in a database system. The database system may reside within the memory 820. In other embodiments, the program data 888 may be remote, such as in a distributed computing and/or storage environment. For example, the program data 888 may be stored in a database system on a remote computing device.

The input/output interface 895 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 894 may facilitate communication with other computing devices and/or networks and/or other computing and/or communications networks. The network interface 894 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network interface 894 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 896 may facilitate communication and/or interaction between the other components of the identity system 881, including the one or more processors 893, the memory 820, the input/output interface 895, and the network interface 894.

As noted, the identity system 881 also includes various program engines 882 (or modules, elements, or components) to implement functionalities of the identity system 881, including an asset transfer client engine 883, an asset lookup and delivery service engine 884, an artist tools engine 885, a 3D character SDK engine 886, and/or a ready room VR engine 887. These elements may be embodied, for example, at least partially in the program engines 882. In other embodiments, these elements may be embodied or otherwise implemented in hardware of the identity system 881. The identity system 881 also includes identity data 889 and 3D asset data 890 that may be stored in the program data 888 which may be generated, accessed, and/or manipulated by the program engines 882.

EXAMPLE EMBODIMENTS

Example 1 is a system for generating a nearest neighboring vertices index for rendering assistance, the system comprising a memory and one or more processors. The memory is configured to store and retrieve the nearest neighboring vertices index, a base figure asset and an item asset. One or more processors configured to: load the base figure asset and the item asset from the memory, select an item vertex of the item asset, and generate, using a k-dimensional tree algorithm or a geodesic algorithm a set of nearest neighbor vertices between the item vertex and vertices of the base figure asset, the set of nearest neighbor vertices limited to a maximum threshold. One or more processors configured to: create the nearest neighboring vertices index based at least in part on the set of nearest neighbor vertices, present, in a user interface, an option to override or add vertices to the nearest neighboring vertices index, generate one or more influence indexes relating to a portion of a derived mesh derived from the base figure asset and the item asset, and render the derived mesh based at least in part on the one or more influence indexes.

Example 2 is the system of Example 1, wherein an influence index from the one or more influence indexes is a region.

Example 3 is the system of Example 2, wherein the region is defined as a head, body, arms, legs, or hands.

Example 4 is the system of Example 1, wherein the maximum threshold is a number of vertices.

Example 5 is the system of Example 1, wherein a size of the set of nearest neighbor vertices is set to a default number of vertices.

Example 6 is the system of Example 1, wherein the one or more processors further comprises a graphics processor.

Example 7 is the system of Example 1, wherein to generate the set of nearest neighbor vertices between the item vertex and vertices of the base figure asset further comprises to use both the k-dimensional tree algorithm and the geodesic algorithm.

Example 8 is the system of Example 1, further comprising a virtual reality interface configured to transmit the derived mesh for display.

Example 9 is the system of Example 1, wherein the base figure asset is an avatar.

Example 10 is a computer program product comprising a computer-readable storage medium that stores instructions for execution by a processor to perform operations of a polygon occlusion portion of a rendering system, the operations, when executed by the processor, to perform a method. The method comprising: loading a base asset and an item asset from memory, wherein the base asset comprises a base set of polygons and the item asset comprises an item set of polygons, overlaying a bounding box of non-edge polygons within the item asset on the figure asset, and indicating, within a polygon occlusion index, polygons of the base asset within the bounding box as occluded. The method comprising: for vertex and center points of item polygons in the item set of polygons, tracing item rays from both sides of an item polygon at a 90-degree angle from a plane defined by the item polygon and determining whether the rays collide with a polygon from the base set of polygons, when an item ray collides with a base polygon from the base set of polygons, store a relationship set of relationships between the item polygon and the base polygon, the item polygon associated with the item ray, and reducing the relationship set to form a subset of the relationship set by removing relationships that include base polygons within the polygon occlusion index from the overlaying the bounding box operation. The method comprising: vertex and center points of base polygons in the subset of the relationship set, tracing item rays from both sides of the base polygon at a 90-degree angle from a plane defined by the base polygon and determining whether the rays collide with a polygon from the item set of polygons, when at least one ray from each of the vertex and center points of the base polygon in the subset of the relationship set intersect one or more item polygons, add the base polygon to the polygon occlusion index as occluded, and when one or more one rays from each of the vertex and center points of the base polygon in the subset of the relationship set intersect one or more item polygons, but less than a ray from each of the vertex and center points of the base polygon, add the base polygon to the polygon occlusion index as partially occluded.

Example 11 is the computer program product of Example 10, wherein the method further comprises: generate an image map that represents portions of a base UV map that is covered by polygons of the item asset based at least in part on the polygon occlusion index; and overlay the image map on the base UV map to form an image that identifies a pixel representation of occluded areas on the base asset.

Example 12 is the computer program product of Example 11, wherein the occluded areas are represented by pixels in the image.

Example 13 is the computer program product of Example 11, wherein the image is an alpha injection map used to modify the base UV map with an item UV map using the representation of occluded areas on the base asset.

Example 14 is the computer program product of Example 11, wherein the image is used to form a combined image map for a combined mesh, the combined mesh including the base asset and the item asset.

Example 15 is a method for heterogeneous mesh behavior in a rendering system, the method comprising: loading an item asset, processing a selection of a set of vertices or polygons from an input, defining a set of behavior types for the selection, the behavior types defining rules including scaling rules, transform rules, or rotation rules, and storing an indication of the selection and the behavior types in a heterogeneous behavior index.

Example 16 is the method of Example 15, wherein the method further comprises to: process one or more deformation instructions of one or more of the vertices or polygons from the selection of the set of vertices or polygons; and apply the behavior types to the one or more deformation instructions with the behavior types having a priority over a conflicting deformation instruction included in the one or more deformation instructions.

Example 17 is the method of Example 15, wherein defining the set of behavior types further comprises selecting a grouping of behavior types.

Example 18 is the method of Example 17, wherein the grouping is defined by a material type.

Example 19 is the method of Example 15, wherein the rules comprise constraints.

Example 20 is the method of Example 15, wherein processing the selection of the set of vertices or polygons from the input further comprises receiving the input from an artist tools system.

The described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be obvious to those having skill in the art that many changes may be made to the details of the above-described embodiments without departing from the underlying principles of the invention. The scope of the present invention should, therefore, be determined only by the following claims.

The invention claimed is:

1. A system for generating a nearest neighboring vertices index for rendering assistance, the system comprising:
    memory configured to store and retrieve the nearest neighboring vertices index, a base figure asset and an item asset;
    one or more processors configured to:
        load the base figure asset and the item asset from the memory;
        select an item vertex of the item asset;
        determine, using a k-dimensional tree algorithm or a geodesic algorithm, a set of nearest neighbor vertices between the item vertex and vertices of the base figure asset, the set of nearest neighbor vertices limited to a maximum threshold;
        create the nearest neighboring vertices index indicating a relationship between the item vertex and the set of nearest neighbor vertices of the base figure asset;
        present, in a user interface, an option to override or add vertices to the nearest neighboring vertices index;
        generate one or more influence indexes relating to a portion of a derived mesh derived from the base figure asset and the item asset; and
        render the derived mesh based at least in part on the one or more influence indexes.

2. The system of claim 1, wherein an influence index from the one or more influence indexes is a region.

3. The system of claim 2, wherein the region is defined as a head, body, arms, legs, or hands.

4. The system of claim 1, wherein the maximum threshold is a number of vertices.

5. The system of claim 1, wherein a size of the set of nearest neighbor vertices is set to a default number of vertices.

6. The system of claim 1, wherein the one or more processors further comprises a graphics processor.

7. The system of claim 1, wherein to generate the set of nearest neighbor vertices between the item vertex and vertices of the base figure asset further comprises to use both the k-dimensional tree algorithm and the geodesic algorithm.

8. The system of claim 1, further comprising a virtual reality interface configured to transmit the derived mesh for display.

9. The system of claim 1, wherein the base figure asset is an avatar.

* * * * *